United States Patent
Leider

(10) Patent No.: US 12,347,448 B2
(45) Date of Patent: Jul. 1, 2025

(54) WEARABLE SYSTEM SPEECH PROCESSING

(71) Applicant: Magic Leap, Inc., Plantation, FL (US)

(72) Inventor: Colby Nelson Leider, Coral Gables, FL (US)

(73) Assignee: Magic Leap, Inc., Plantation, FL (US)

( * ) Notice: Subject to any disclaimer, the term of this patent is extended or adjusted under 35 U.S.C. 154(b) by 9 days.

(21) Appl. No.: 18/510,376

(22) Filed: Nov. 15, 2023

(65) Prior Publication Data

US 2024/0087587 A1    Mar. 14, 2024

Related U.S. Application Data

(63) Continuation of application No. 17/254,832, filed as application No. PCT/US2019/038546 on Jun. 21, 2019, now Pat. No. 11,854,566.

(Continued)

(51) Int. Cl.
  G10L 21/02    (2013.01)
  G02B 27/01   (2006.01)
  (Continued)

(52) U.S. Cl.
  CPC ........ G10L 21/0208 (2013.01); G02B 27/017 (2013.01); G10L 15/18 (2013.01);
  (Continued)

(58) Field of Classification Search
  CPC ....... G10L 21/0208; G10L 2021/02166; G10L 2021/02082; H04R 1/1083
  See application file for complete search history.

(56) References Cited

U.S. PATENT DOCUMENTS

| 4,158,750 A | 6/1979 | Sakoe |
|---|---|---|
| 4,852,988 A | 8/1989 | Velez |

(Continued)

FOREIGN PATENT DOCUMENTS

| CA | 2316473 A1 | 1/2001 |
|---|---|---|
| CA | 2362895 A1 | 12/2002 |

(Continued)

OTHER PUBLICATIONS

Kaushik, Mayank, et al. "Three dimensional microphone and source position estimation using TDOA and TOF measurements." 2011 IEEE International Conference on Signal Processing, Communications and Computing (ICSPCC). IEEE, 2011. (Year: 2011).*

(Continued)

Primary Examiner — Jialong He
(74) Attorney, Agent, or Firm — Morrison & Foerster LLP

(57) ABSTRACT

A method of processing an acoustic signal is disclosed. According to one or more embodiments, a first acoustic signal is received via a first microphone. The first acoustic signal is associated with a first speech of a user of a wearable headgear unit. A first sensor input is received via a sensor, a control parameter is determined based on the sensor input. The control parameter is applied to one or more of the first acoustic signal, the wearable headgear unit, and the first microphone. Determining the control parameter comprises determining, based on the first sensor input, a relationship between the first speech and the first acoustic signal.

21 Claims, 6 Drawing Sheets

Related U.S. Application Data

(60) Provisional application No. 62/687,987, filed on Jun. 21, 2018.

(51) Int. Cl.
*G10L 15/18* (2013.01)
*G10L 15/22* (2006.01)
*G10L 15/26* (2006.01)
*G10L 21/0208* (2013.01)
*G10L 21/0216* (2013.01)

(52) U.S. Cl.
CPC .............. *G10L 15/22* (2013.01); *G10L 15/26* (2013.01); *G02B 2027/0178* (2013.01); *G10L 2021/02082* (2013.01); *G10L 2021/02166* (2013.01)

(56) References Cited

U.S. PATENT DOCUMENTS

| | | | |
|---|---|---|---|
| 5,627,899 A * | 5/1997 | Craven | H03H 21/0012 381/103 |
| 6,433,760 B1 | 8/2002 | Vaissie | |
| 6,491,391 B1 | 12/2002 | Blum et al. | |
| 6,496,799 B1 | 12/2002 | Pickering | |
| 6,738,482 B1 * | 5/2004 | Jaber | H04R 1/406 379/406.01 |
| 6,820,056 B1 | 11/2004 | Harif | |
| 6,847,336 B1 | 1/2005 | Lemelson | |
| 6,943,754 B2 | 9/2005 | Aughey | |
| 6,977,776 B2 | 12/2005 | Volkenandt et al. | |
| 7,346,654 B1 | 3/2008 | Weiss | |
| 7,347,551 B2 | 3/2008 | Fergason et al. | |
| 7,488,294 B2 | 2/2009 | Torch | |
| 7,587,319 B2 | 9/2009 | Catchpole | |
| 7,979,277 B2 | 7/2011 | Larri et al. | |
| 8,154,588 B2 | 4/2012 | Burns | |
| 8,235,529 B1 | 8/2012 | Raffle | |
| 8,611,015 B2 | 12/2013 | Wheeler | |
| 8,638,498 B2 | 1/2014 | Bohn et al. | |
| 8,696,113 B2 | 4/2014 | Lewis | |
| 8,929,589 B2 | 1/2015 | Publicover et al. | |
| 9,010,929 B2 | 4/2015 | Lewis | |
| 9,274,338 B2 | 3/2016 | Robbins et al. | |
| 9,292,973 B2 | 3/2016 | Bar-Zeev et al. | |
| 9,294,860 B1 | 3/2016 | Carlson | |
| 9,323,325 B2 | 4/2016 | Perez et al. | |
| 9,715,875 B2 | 7/2017 | Piernot | |
| 9,720,505 B2 | 8/2017 | Gribetz et al. | |
| 10,013,053 B2 | 7/2018 | Cederlund et al. | |
| 10,025,379 B2 | 7/2018 | Drake et al. | |
| 10,062,377 B2 | 8/2018 | Larri et al. | |
| 10,134,425 B1 | 11/2018 | Johnson, Jr. | |
| 10,289,205 B1 | 5/2019 | Sumter | |
| 10,839,789 B2 | 11/2020 | Larri et al. | |
| 10,971,140 B2 | 4/2021 | Catchpole | |
| 11,151,997 B2 | 10/2021 | Sugiyama et al. | |
| 11,328,740 B2 | 5/2022 | Lee et al. | |
| 11,587,563 B2 | 2/2023 | Sheeder et al. | |
| 11,790,935 B2 | 10/2023 | Lee et al. | |
| 11,854,550 B2 | 12/2023 | Sheeder et al. | |
| 11,854,566 B2 | 12/2023 | Leider | |
| 11,917,384 B2 | 2/2024 | Roach | |
| 12,094,489 B2 | 9/2024 | Lee | |
| 12,238,496 B2 | 2/2025 | Roach et al. | |
| 12,243,531 B2 | 3/2025 | Sheeder et al. | |
| 2001/0055985 A1 | 12/2001 | Matt et al. | |
| 2003/0030597 A1 | 2/2003 | Geist | |
| 2005/0033571 A1 | 2/2005 | Huang | |
| 2005/0069852 A1 | 3/2005 | Janakiraman et al. | |
| 2006/0023158 A1 | 2/2006 | Howell et al. | |
| 2006/0072767 A1 | 4/2006 | Zhang et al. | |
| 2006/0098827 A1 | 5/2006 | Paddock et al. | |
| 2006/0178876 A1 | 8/2006 | Sato et al. | |
| 2007/0225982 A1 | 9/2007 | Washio | |
| 2008/0124690 A1 | 5/2008 | Redlich | |
| 2008/0201138 A1 | 8/2008 | Visser et al. | |
| 2009/0180626 A1 | 7/2009 | Nakano | |
| 2010/0245585 A1 | 9/2010 | Fisher et al. | |
| 2010/0323652 A1 | 12/2010 | Visser et al. | |
| 2011/0211056 A1 | 9/2011 | Publicover et al. | |
| 2011/0213664 A1 | 9/2011 | Osterhout | |
| 2011/0238407 A1 | 9/2011 | Kent | |
| 2011/0288860 A1 | 11/2011 | Schevciw et al. | |
| 2012/0021806 A1 | 1/2012 | Maltz | |
| 2012/0130713 A1 | 5/2012 | Shin et al. | |
| 2012/0209601 A1 | 8/2012 | Jing | |
| 2013/0077147 A1 | 3/2013 | Efimov | |
| 2013/0204607 A1 | 8/2013 | Baker, IV | |
| 2013/0226589 A1 | 8/2013 | Largey | |
| 2013/0236040 A1 * | 9/2013 | Crawford | H04S 7/306 381/310 |
| 2013/0339028 A1 | 12/2013 | Rosner et al. | |
| 2014/0016793 A1 | 1/2014 | Gardner | |
| 2014/0194702 A1 | 7/2014 | Tran | |
| 2014/0195918 A1 | 7/2014 | Friedlander | |
| 2014/0200887 A1 | 7/2014 | Nakadai et al. | |
| 2014/0222430 A1 | 8/2014 | Rao | |
| 2014/0270202 A1 | 9/2014 | Ivanov et al. | |
| 2014/0270244 A1 | 9/2014 | Fan | |
| 2014/0310595 A1 * | 10/2014 | Acharya | G06F 3/011 715/706 |
| 2014/0337023 A1 | 11/2014 | Mcculloch et al. | |
| 2014/0379336 A1 | 12/2014 | Bhatnagar | |
| 2015/0006181 A1 | 1/2015 | Fan et al. | |
| 2015/0168731 A1 | 6/2015 | Robbins | |
| 2015/0310857 A1 | 10/2015 | Habets et al. | |
| 2015/0348572 A1 | 12/2015 | Thornburg et al. | |
| 2016/0019910 A1 | 1/2016 | Faubel et al. | |
| 2016/0066113 A1 | 3/2016 | Elkhatib et al. | |
| 2016/0112817 A1 | 4/2016 | Fan et al. | |
| 2016/0142830 A1 | 5/2016 | Hu | |
| 2016/0165340 A1 | 6/2016 | Benattar | |
| 2016/0180837 A1 | 6/2016 | Gustavsson | |
| 2016/0216130 A1 | 7/2016 | Abramson et al. | |
| 2016/0217781 A1 | 7/2016 | Zhong et al. | |
| 2016/0284350 A1 | 9/2016 | Yun et al. | |
| 2016/0358598 A1 | 12/2016 | Williams et al. | |
| 2016/0379629 A1 | 12/2016 | Hofer et al. | |
| 2016/0379632 A1 | 12/2016 | Hoffmeister et al. | |
| 2016/0379638 A1 | 12/2016 | Basye et al. | |
| 2017/0078819 A1 | 3/2017 | Habets | |
| 2017/0091169 A1 | 3/2017 | Bellegarda | |
| 2017/0092276 A1 | 3/2017 | Sun et al. | |
| 2017/0110116 A1 | 4/2017 | Tadpatrikar et al. | |
| 2017/0148429 A1 | 5/2017 | Hayakawa | |
| 2017/0270919 A1 | 9/2017 | Parthasarathi et al. | |
| 2017/0280239 A1 | 9/2017 | Sekiya | |
| 2017/0316780 A1 | 11/2017 | Lovitt | |
| 2017/0330555 A1 | 11/2017 | Kawano | |
| 2017/0332187 A1 | 11/2017 | Lin | |
| 2018/0011534 A1 | 1/2018 | Poulos et al. | |
| 2018/0053284 A1 | 2/2018 | Rodriguez et al. | |
| 2018/0077095 A1 | 3/2018 | Deyle et al. | |
| 2018/0129469 A1 | 5/2018 | Vennström et al. | |
| 2018/0227665 A1 | 8/2018 | Elko et al. | |
| 2018/0316939 A1 | 11/2018 | Todd | |
| 2018/0336902 A1 | 11/2018 | Cartwright et al. | |
| 2018/0349946 A1 | 12/2018 | Nguyen | |
| 2018/0358021 A1 | 12/2018 | Mistica et al. | |
| 2018/0366114 A1 | 12/2018 | Anbazhagan et al. | |
| 2019/0129944 A1 | 5/2019 | Kawano | |
| 2019/0362704 A1 | 11/2019 | Nicolis et al. | |
| 2019/0362741 A1 | 11/2019 | Li et al. | |
| 2019/0373362 A1 | 12/2019 | Ansai et al. | |
| 2019/0392641 A1 | 12/2019 | Taylor | |
| 2020/0027455 A1 | 1/2020 | Sugiyama et al. | |
| 2020/0064921 A1 | 2/2020 | Kang et al. | |
| 2020/0194028 A1 | 6/2020 | Lipman | |
| 2020/0213729 A1 | 7/2020 | Soto | |
| 2020/0279552 A1 | 9/2020 | Piersol et al. | |
| 2020/0286465 A1 | 9/2020 | Wang et al. | |
| 2020/0296521 A1 | 9/2020 | Wexler et al. | |
| 2020/0335128 A1 | 10/2020 | Sheeder et al. | |

(56) References Cited

U.S. PATENT DOCUMENTS

| | | |
|---|---|---|
| 2021/0056966 A1 | 2/2021 | Bilac et al. |
| 2021/0125609 A1 | 4/2021 | Dusan et al. |
| 2021/0192413 A1 | 6/2021 | Shirazipour |
| 2021/0306751 A1 | 9/2021 | Roach et al. |
| 2023/0386461 A1 | 11/2023 | Leider |
| 2023/0410835 A1 | 12/2023 | Lee |
| 2024/0087565 A1 | 3/2024 | Sheeder |
| 2024/0163612 A1 | 5/2024 | Roach |
| 2024/0420718 A1 | 12/2024 | Audfray |
| 2025/0006219 A1 | 1/2025 | Lee |

FOREIGN PATENT DOCUMENTS

| | | | |
|---|---|---|---|
| CA | 2388766 | A1 | 12/2003 |
| CN | 105529033 | A | 4/2016 |
| EP | 2950307 | A1 | 12/2015 |
| EP | 3211918 | A1 | 8/2017 |
| JP | S52144205 | A | 12/1977 |
| JP | 06075588 | A | 3/1994 |
| JP | 2000148184 | A | 5/2000 |
| JP | 2000261534 | A | 9/2000 |
| JP | 2002135173 | A | 5/2002 |
| JP | 2003264883 | A | 9/2003 |
| JP | 2005196134 | A | 7/2005 |
| JP | 2008242067 | A | 10/2008 |
| JP | 2010273305 | A | 12/2010 |
| JP | 2013183358 | A | 9/2013 |
| JP | 2014137405 | A | 7/2014 |
| JP | 2014178339 | A | 9/2014 |
| JP | 2016004270 | A | 1/2016 |
| JP | 2017211596 | A | 11/2017 |
| JP | 2018523156 | A | 8/2018 |
| JP | 2018179954 | A | 11/2018 |
| WO | 2014113891 | A1 | 7/2014 |
| WO | 2014159581 | A1 | 10/2014 |
| WO | 2015169618 | A1 | 11/2015 |
| WO | 2016063587 | A1 | 4/2016 |
| WO | 2016151956 | A1 | 9/2016 |
| WO | 2016153712 | A1 | 9/2016 |
| WO | 2017003903 | A1 | 1/2017 |
| WO | 2017017591 | A1 | 2/2017 |
| WO | 2017191711 | A1 | 11/2017 |
| WO | 2018163648 | A1 | 9/2018 |
| WO | 2019224292 | A1 | 11/2019 |
| WO | 2020180719 | A1 | 9/2020 |
| WO | 2020214844 | A1 | 10/2020 |
| WO | 2022072752 | A1 | 4/2022 |
| WO | 2023064875 | A1 | 4/2023 |

OTHER PUBLICATIONS

Backstrom, T. (Oct. 2015). "Voice Activity Detection Speech Processing," Aalto University, vol. 58, No. 10; Publication [online], retrieved Apr. 19, 2020, retrieved from the Internet: URL: https://mycourses.aalto.fi/pluginfile.php/146209/mod_resource/content/1/slides_07_vad.pdf, ; pp. 1-36.

Bilac, M. et al. (Nov. 15, 2017). Gaze and Filled Pause Detection for Smooth Human-Robot Conversations. www.angelicalim.com, retrieved on Jun. 17, 2020, Retrieved from the internet URL: http://www.angelicalim.com/papers/humanoids2017_paper.pdf entire document, 8 pages.

Chinese Office Action dated Dec. 21, 2023, for CN Application No. 201980050714.4, with English translation, eighteen pages.

European Office Action dated Jun. 1, 2023, for EP Application No. 19822754.8, six pages.

European Search Report dated Nov. 12, 2021, for EP Application No. 19822754.8, ten pages.

European Search Report dated Nov. 21, 2022, for EP Application No. 20791183.5 nine pages.

European Search Report dated Oct. 6, 2022, for EP Application No. 20766540.7 nine pages.

Final Office Action mailed Apr. 10, 2023, for U.S. Appl. No. 16/850,965, filed Apr. 16, 2020, sixteen pages.

Final Office Action mailed Apr. 15, 2022, for U.S. Appl. No. 16/850,965, filed Apr. 16, 2020, fourteen pages.

Final Office Action mailed Aug. 4, 2023, for U.S. Appl. No. 17/254,832, filed Dec. 21, 2020, seventeen pages.

Final Office Action mailed Aug. 5, 2022, for U.S. Appl. No. 16/805,337, filed Feb. 28, 2020, eighteen pages.

Final Office Action mailed Jan. 11, 2023, for U.S. Appl. No. 17/214,446, filed Mar. 26, 2021, sixteen pages.

Final Office Action mailed Jan. 23, 2024, for U.S. Appl. No. 16/850,965, filed Apr. 16, 2020, fifteen pages.

Final Office Action mailed Oct. 6, 2021, for U.S. Appl. No. 16/805,337, filed Feb. 28, 2020, fourteen pages.

Final Office Action mailed Sep. 7, 2023, for U.S. Appl. No. 17/214,446, filed Mar. 26, 2021, nineteen pages.

Harma, A. et al. (Jun. 2004). "Augmented Reality Audio for Mobile and Wearable Appliances," J. Audio Eng. Soc., vol. 52, No. 6, retrieved on Aug. 20, 2019, Retrieved from the Internet: URL:https://pdfs.semanticscholar.org/ae54/82c6a8d4add3e9707d780dfb5ce03d8e0120.pdf , 22 pages.

International Preliminary Report and Patentability mailed Dec. 22, 2020, for PCT Application No. PCT/US2019/038546, 13 pages.

International Preliminary Report and Written Opinion mailed Apr. 13, 2023, for PCT Application No. PCT/US2021/53046, filed Sep. 30, 2021, nine pages.

International Preliminary Report and Written Opinion mailed Oct. 28, 2021, for PCT Application No. PCT/US2020/028570, filed Apr. 16, 2020, 17 pages.

International Preliminary Report and Written Opinion mailed Sep. 16, 2021, for PCT Application No. PCT/US20/20469, filed Feb. 28, 2020, nine pages.

International Search Report and Written Opinion mailed Jan. 24, 2022, for PCT Application No. PCT/US2021/53046, filed Sep. 30, 2021, 15 pages.

International Search Report and Written Opinion mailed Jul. 2, 2020, for PCT Application No. PCT/US2020/028570, filed Apr. 16, 2020, nineteen pages.

International Search Report and Written Opinion mailed May 18, 2020, for PCT Application No. PCT/US20/20469, filed Feb. 28, 2020, twenty pages.

International Search Report and Written Opinion mailed Sep. 17, 2019, for PCT Application No. PCT/US2019/038546, sixteen pages.

Jacob, R. "Eye Tracking in Advanced Interface Design", Virtual Environments and Advanced Interface Design, Oxford University Press, Inc. (Jun. 1995).

Japanese Notice of Allowance mailed Dec. 15, 2023, for JP Application No. 2020-571488, with English translation, eight pages.

Japanese Office Action dated Jun. 2, 2023, for JP Application No. 2020 571488, with English translation, 9 pages.

Kitayama, K. et al. (Sep. 30, 2003). "Speech Starter: Noise-Robust Endpoint Detection by Using Filled Pauses." Eurospeech 2003, retrieved on Jun. 17, 2020, retrieved from the internet URL: http://clteseerx.ist.psu.edu/viewdoc/download? doi=10 .1.1.141.1472 &rep=rep1&type=pdf entire document, pp. 1237-1240.

Liu, Baiyang, et al.: (Sep. 6, 2015). "Accurate Endpointing with Expected Pause Duration," INTERSPEECH 2015, pp. 2912-2916, retrieved from: a href="https://scholar.google.com/scholar?q=BAIYANG"target="_blank"https://scholar.google.com/scholar?q=BAIYANG/a,+Liu+et+al.:+(September+6,+2015).+"Accurate+endpointing+with+expected+pause+duration,&hl=en&as_sdt=0&as_vis=1&oi=scholart.

Non-Final Office Action mailed Apr. 12, 2023, for U.S. Appl. No. 17/214,446, filed Mar. 26, 2021, seventeen pages.

Non-Final Office Action mailed Apr. 13, 2023, for U.S. Appl. No. 17/714,708, filed Apr. 6, 2022, sixteen pages.

Non-Final Office Action mailed Apr. 27, 2023, for U.S. Appl. No. 17/254,832, filed Dec. 21, 2020, fourteen pages.

Non-Final Office Action mailed Aug. 10, 2022, for U.S. Appl. No. 17/214,446, filed Mar. 26, 2021, fifteen pages.

Non-Final Office Action mailed Jun. 23, 2023, for U.S. Appl. No. 18/148,221, filed Dec. 29, 2022, thirteen pages.

(56) References Cited

OTHER PUBLICATIONS

Non-Final Office Action mailed Jun. 24, 2021, for U.S. Appl. No. 16/805,337, filed Feb. 28, 2020, fourteen pages.
Non-Final Office Action mailed Mar. 17, 2022, for U.S. Appl. No. 16/805,337, filed Feb. 28, 2020, sixteen pages.
Non-Final Office Action mailed Nov. 17, 2021, for U.S. Appl. No. 16/987,267, filed Aug. 6, 2020, 21 pages.
Non-Final Office Action mailed Oct. 4, 2021, for U.S. Appl. No. 16/850,965, filed Apr. 16, 2020, twelve pages.
Non-Final Office Action mailed Sep. 15, 2023, for U.S. Appl. No. 16/850,965, filed Apr. 16, 2020, fourteen pages.
Non-Final Office Action mailed Sep. 29, 2022, for U.S. Appl. No. 16/850,965, filed Apr. 16, 2020, fifteen pages.
Notice of Allowance mailed Dec. 15, 2023, for U.S. Appl. No. 17/214,446, filed Mar. 26, 2021, seven pages.
Notice of Allowance mailed Jul. 31, 2023, for U.S. Appl. No. 17/714,708, filed Apr. 6, 2022, eight pages.
Notice of Allowance mailed Mar. 3, 2022, for U.S. Appl. No. 16/987,267, filed Aug. 6, 2020, nine pages.
Notice of Allowance mailed Nov. 30, 2022, for U.S. Appl. No. 16/805,337, filed Feb. 28, 2020, six pages.
Notice of Allowance mailed Oct. 12, 2023, for U.S. Appl. No. 18/148,221, filed Dec. 29, 2022, five pages.
Notice of Allowance mailed Oct. 17, 2023, for U.S. Appl. No. 17/254,832, filed Dec. 21, 2020, sixteen pages.
Rolland, J. et al., "High-resolution inset head-mounted display", Optical Society of America, vol. 37, No. 19, Applied Optics, (Jul. 1, 1998).
Shannon, Matt et al. (Aug. 20-24, 2017). "Improved End-of-Query Detection for Streaming Speech Recognition", INTERSPEECH 2017, Stockholm, Sweden, pp. 1909-1913.
Tanriverdi, V. et al. (Apr. 2000). "Interacting With Eye Movements In Virtual Environments," Department of Electrical Engineering and Computer Science, Tufts University, Medford, MA 02155, USA, Proceedings of the SIGCHI conference on Human Factors in Computing Systems, eight pages.
Tonges, R. (Dec. 2015). "An augmented Acoustics Demonstrator with Realtime stereo up-mixing and Binaural Auralization," Technische University Berlin, Audio Communication Group, retrieved on Aug. 22, 2019, Retrieved from the Internet: URL: https://www2.ak.tu-berlin.de/~akgroup/ak_pub/abschlussarbeiten/2015/ToengesRaffael_MasA.pdf 100 pages.
Yoshida, A. et al., "Design and Applications of a High Resolution Insert Head Mounted Display", (Jun. 1994).
International Preliminary Report and Written Opinion mailed Apr. 25, 2024, for PCT Application No. PCT/US2022/078063, seven pages.
International Preliminary Report on Patentability and Written Opinion mailed Apr. 25, 2024, for PCT Application No. PCT/US2022/078073, seven pages.
International Preliminary Report on Patentability and Written Opinion mailed May 2, 2024, for PCT Application No. PCT/US2022/078298, twelve pages.
International Search Report and Written Opinion mailed Jan. 11, 2023, for PCT Application No. PCT/US2022/078298, seventeen pages.
International Search Report and Written Opinion mailed Jan. 17, 2023, for PCT Application No. PCT/US2022/078073, thirteen pages.
International Search Report and Written Opinion mailed Jan. 25, 2023, for PCT Application No. PCT/US2022/078063, nineteen pages.
Japanese Office Action mailed May 2, 2024, for JP Application No. 2021-562002, with English translation, sixteen pages.
Notice of Allowance mailed Jun. 5, 2024, for U.S. Appl. No. 18/459,342, filed Aug. 31, 2023, eight pages.
Japanese Notice of Allowance mailed Oct. 28, 2024, for JP Application No. 2021-551538 with English translation, six pages.
Non-Final Office Action mailed Aug. 26, 2024, for U.S. Appl. No. 18/418,131, filed Jan. 19, 2024, ten pages.
Non-Final Office Action mailed Nov. 6, 2024, for U.S. Appl. No. 16/850,965, filed Apr. 16, 2020, twenty pages.
Japanese Office Action mailed Jan. 30, 2024, for JP Application No. 2021-551538, with English translation, sixteen pages.
European Office Action dated Dec. 12, 2023, for EP Application No. 20766540.7, four pages.
Non-Final Office Action mailed Mar. 27, 2024, for U.S. Appl. No. 16/850,965, filed Apr. 16, 2020, Sixteen pages.
Chinese Notice of Allowance dated Nov. 7, 2024, for CN Application No. 201980050714.4, with English translation, 6 pages.
Hatashima, Takashi et al. "A study on a subband acoustic echo chaceller using a single microphone, Institute of Electronics, Information and Communication Engineers technical research report", Feb. 1995, vol. 94, No. 522, p. 1-8 (document showing a well-known technique). Note: An English language abstract can be found on the cover page of this reference.
Japanese Office Action mailed Nov. 7, 2024, for JP Application No. 2023-142856, with English translation, 12 pages.
Notice of Allowance mailed Dec. 11, 2024, for U.S. Appl. No. 18/418,131, filed Jan. 19, 2024, seven pages.
Japanese Notice of Allowance mailed Aug. 21, 2024, for JP Application No. 2021-562002, with English translation, 6 pages.
Non-Final Office Action mailed Aug. 26, 2024, for U.S. Appl. No. 18/506,866, filed Nov. 10, 2023, twelve pages.
Japanese Final Office Action mailed May 31, 2024, for JP Application No. 2021-551538, with English translation, eighteen pages.
Final Office Action mailed Jul. 17, 2024, for U.S. Appl. No. 16/850,965, filed Apr. 16, 2020, seventeen pages.
European Notice of Allowance dated Jul. 15, 2024, for EP Application No. 20791183.5 nine pages.
Chinese Notice of Allowance dated Feb. 18, 2025, for CN Application No. 202080044362.4, with English translation, 7 pages.
Chinese Office Action dated Feb. 12, 2025, for CN Application No. 202080031993.2, with English translation, 18 pages.
European Search Report dated Jan. 20, 2025, for EP Application No. 24221982.2 nine pages.
Non-Final Office Action mailed Mar. 4, 2025, for U.S. Appl. No. 18/029,355, filed Mar. 29, 2023, ten pages.
Notice of Allowance mailed Dec. 19, 2024, for U.S. Appl. No. 18/506,866, filed Nov. 10, 2023, five pages.
Notice of Allowance mailed Apr. 2, 2025, for U.S. Appl. No. 16/850,965, filed Apr. 16, 2020, ten pages.
Japanese Office Action mailed Apr. 16, 2025, for JP Application No. 2023-142856, with English translation, 6 pages.

* cited by examiner

WEARABLE SYSTEM SPEECH PROCESSING

CROSS-REFERENCE TO RELATED APPLICATIONS

This application is a continuation of U.S. application Ser. No. 17/254,832, filed Dec. 21, 2020, which is national stage application under 35 U.S.C. § 371 of International Application No. PCT/US2019/038546, filed internationally on Jun. 21, 2019, which claims benefit of U.S. Provisional Patent Application No. 62/687,987, filed Jun. 21, 2018, which are hereby incorporated by reference in their entirety.

FIELD

This disclosure relates in general to systems and methods for processing acoustic speech signals, and in particular to systems and methods for processing acoustic speech signals generated by a user of a wearable device.

BACKGROUND

Tools for speech processing are tasked with receiving audio input representing human speech, typically via a microphone, and processing the audio input to determine words, logical structures, or other outputs corresponding to that audio input. For example, automatic speech recognition (ASR) tools may generate a text output based on the human speech corresponding to an audio input signal; and natural language processing (NLP) tools may generate logical structures, or computer data, corresponding to the meaning of that human speech. It is desirable for such processes to happen accurately and quickly with some applications demanding results in real-time.

Computer speech processing systems have a history of producing dubious results. In general, the accuracy of a speech processing system can be highly dependent on the quality of the input audio signal, with the highest accuracy obtained from inputs provided under controlled conditions. For example, speech processing systems may perform admirably when the audio input is clearly enunciated speech captured by a microphone at a direct angle, and at close range, with no environmental noise, a high signal/noise ratio, and a constant volume level. However, speech processing systems may struggle to accommodate the many variables that can be introduced into input audio signals by real-world conditions. For example, speech processing signals may demonstrate limited accuracy when multiple speech sources are present (e.g., multiple people speaking at once in the same space); when environmental noise (e.g., wind, rain, electrical interference, ambient noise) blends with a source speech signal; when the human speaker does not enunciate clearly, or speaks with an idiosyncratic or inconsistent tone, accent, or inflection; when the speaker moves or rotates relative to a microphone; when the speaker is in an acoustically reflective environment (e.g., a tiled bathroom or a large cathedral); when the speaker is a large distance from a microphone; when the speaker faces away from the microphone; or when any number of other variables are present and compromise the fidelity of the input audio signal. These problems may be magnified in mobile or outdoor applications, in which unpredictable sources of noise may be present; and in which attempts to control or understand the speaker's vicinity may be made difficult or impossible.

It is desirable to use sensor-equipped wearable systems, such as those that incorporate a head-mounted unit, to correct for the effects of such variables on input audio signals for speech processing systems. By presenting speech processing systems with more predictable, higher fidelity input, the outputs of those systems can generate more accurate and more reliable results. In addition, wearable systems are well suited for mobile, outdoor applications precisely the type of applications in which many conventional speech processing systems may perform especially poorly.

BRIEF SUMMARY

Examples of the disclosure describe systems and methods for processing acoustic signals. According to one or more embodiments, a first acoustic signal is received via a first microphone. The first acoustic signal is associated with a first speech of a user of a wearable headgear unit. A first sensor input is received via a sensor, a control parameter is determined based on the sensor input. The control parameter is applied to one or more of the first acoustic signal, the wearable headgear unit, and the first microphone. Determining the control parameter comprises determining, based on the first sensor input, a relationship between the first speech and the first acoustic signal.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

EXAMPLE WEARABLE SYSTEM

Figure 1:
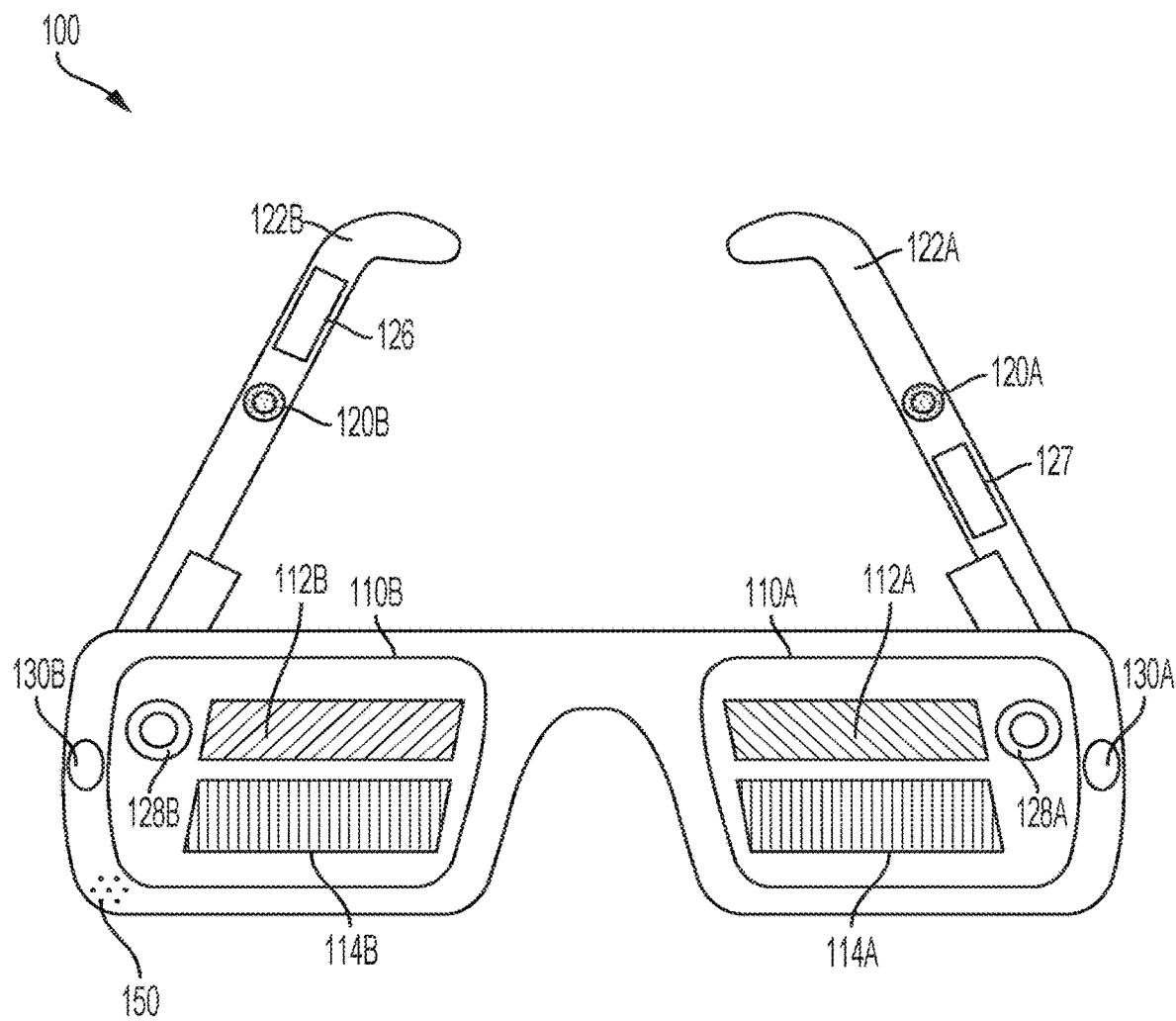
FIG. 1 illustrates an example wearable head device that can be used as part of a wearable system, according to some embodiments.

FIG. 1 illustrates an example wearable head device 100 configured to be worn on the head of a user. Wearable head device 100 may be part of a broader wearable system that comprises one or more components, such as a head device (e.g., wearable head device 100), a handheld controller (e.g., handheld controller 200 described below), and/or an auxiliary unit (e.g., auxiliary unit 300 described below). In some examples, wearable head device 100 can be used for virtual reality, augmented reality, or mixed reality systems or applications. Wearable head device 100 can comprise one or more displays, such as displays 110A and 110B (which may comprise left and right transmissive displays, and associated components for coupling light from the displays to the user's eyes, such as orthogonal pupil expansion (OPE) grating sets 112A/112B and exit pupil expansion (EPE) grating sets 114A/114B); left and right acoustic structures, such as speakers 120A and 120B (which may be mounted on temple arms 122A and 122B, and positioned adjacent to the user's left and right ears, respectively); one or more sensors such as infrared sensors, accelerometers, GPS units, inertial measurement units (IMU)(e.g. IMU 126), acoustic sensors (e.g., microphone 150); orthogonal coil electromagnetic receivers (e.g., receiver 127 shown mounted to the left temple arm 122A); left and right cameras (e.g., depth (time-of-flight) cameras 130A and 130B) oriented away from the user; and left and right eye cameras oriented toward the user (e.g., for detecting the user's eye movements)(e.g., eye cameras 128 and 128B). However, wearable head device 100 can incorporate any suitable display technology, and any suitable number, type, or combination of sensors or other components without departing from the scope of the invention. In some examples, wearable head device 100 may incorporate one or more microphones 150 configured to detect audio signals generated by the user's voice; such microphones may be positioned in a wearable head device adjacent to the user's mouth. In some examples, wearable head device 100 may incorporate networking features (e.g., Wi-Fi capability) to communicate with other devices and systems, including other wearable systems. Wearable head device 100 may further include components such as a battery, a processor, a memory, a storage unit, or various input devices (e.g., buttons, touchpads); or may be coupled to a handheld controller (e.g., handheld controller 200) or an auxiliary unit (e.g., auxiliary unit 300) that comprises one or more such components. In some examples, sensors may be configured to output a set of coordinates of the head-mounted unit relative to the user's environment, and may provide input to a processor performing a Simultaneous Localization and Mapping (SLAM) procedure and/or a visual odometry algorithm. In some examples, wearable head device 100 may be coupled to a handheld controller 200, and/or an auxiliary unit 300, as described further below.

Figure 2:
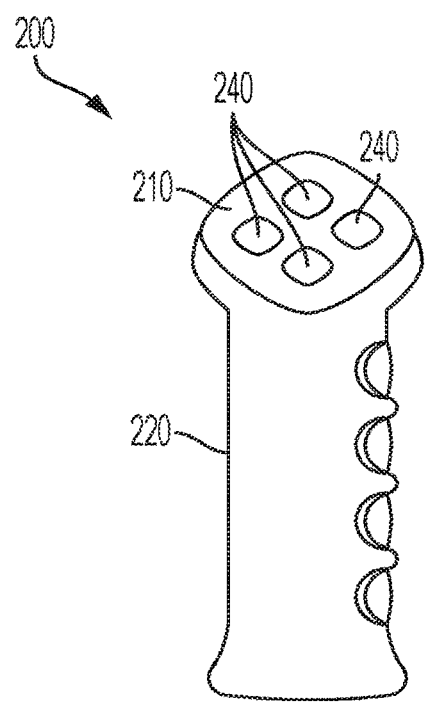
FIG. 2 illustrates an example handheld controller that can be used as part of a wearable system, according to some embodiments.

FIG. 2 illustrates an example mobile handheld controller component 200 of an example wearable system. In some examples, handheld controller 200 may be in wired or wireless communication with wearable head device 100 and/or auxiliary unit 300 described below. In some examples, handheld controller 200 includes a handle portion 220 to be held by a user, and one or more buttons 240 disposed along a top surface 210. In some examples, handheld controller 200 may be configured for use as an optical tracking target; for example, a sensor (e.g., a camera or other optical sensor) of wearable head device 100 can be configured to detect a position and/or orientation of handheld controller 200 which may, by extension, indicate a position and/or orientation of the hand of a user holding handheld controller 200. In some examples, handheld controller 200 may include a processor, a memory, a storage unit, a display, or one or more input devices, such as described above. In some examples, handheld controller 200 includes one or more sensors (e.g., any of the sensors or tracking components described above with respect to wearable head device 100). In some examples, sensors can detect a position or orientation of handheld controller 200 relative to wearable head device 100 or to another component of a wearable system. In some examples, sensors may be positioned in handle portion 220 of handheld controller 200, and/or may be mechanically coupled to the handheld controller. Handheld controller 200 can be configured to provide one or more output signals, corresponding, for example, to a pressed state of the buttons 240; or a position, orientation, and/or motion of the handheld controller 200 (e.g., via an IMU). Such output signals may be used as input to a processor of wearable head device 100, to auxiliary unit 300, or to another component of a wearable system. In some examples, handheld controller 200 can include one or more microphones to detect sounds (e.g., a user's speech, environmental sounds), and in some cases provide a signal corresponding to the detected sound to a processor (e.g., a processor of wearable head device 100).

Figure 3:
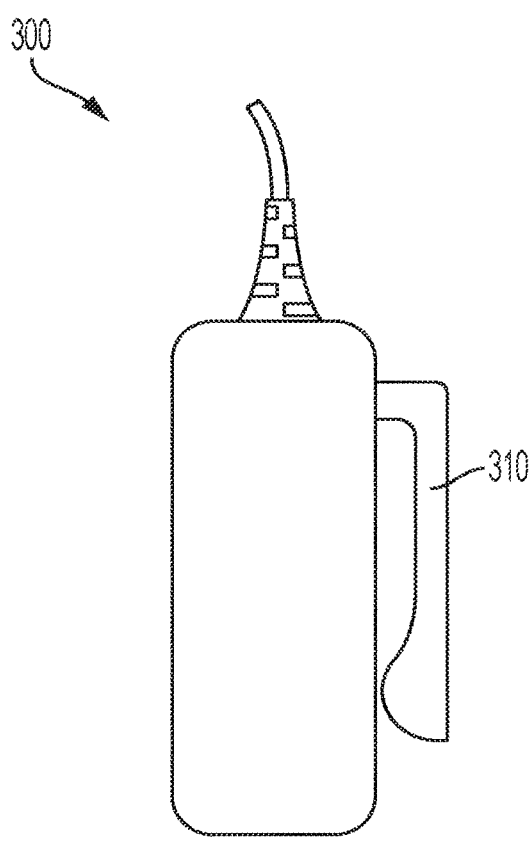
FIG. 3 illustrates an example auxiliary unit that can be used as part of a wearable system, according to some embodiments.

FIG. 3 illustrates an example auxiliary unit 300 of an example wearable system. In some examples, auxiliary unit 300 may be in wired or wireless communication with wearable head device 100 and/or handheld controller 200. The auxiliary unit 300 can include a battery to provide energy to operate one or more components of a wearable system, such as wearable head device 100 and/or handheld controller 200 (including displays, sensors, acoustic structures, processors, microphones, and/or other components of wearable head device 100 or handheld controller 200). In some examples, auxiliary unit 300 may include a processor, a memory, a storage unit, a display, one or more input devices, and/or one or more sensors, such as described above. In some examples, auxiliary unit 300 includes a clip 310 for attaching the auxiliary unit to a user (e.g., a belt worn by the user). An advantage of using auxiliary unit 300 to house one or more components of a wearable system is that doing so may allow large or heavy components to be carried on a user's waist, chest, or back—which are relatively well suited to support large and heavy objects—rather than mounted to the user's head (e.g., if housed in wearable head device 100) or carried by the user's hand (e.g., if housed in handheld controller 200). This may be particularly advantageous for relatively heavy or bulky components, such as batteries.

Figure 4:
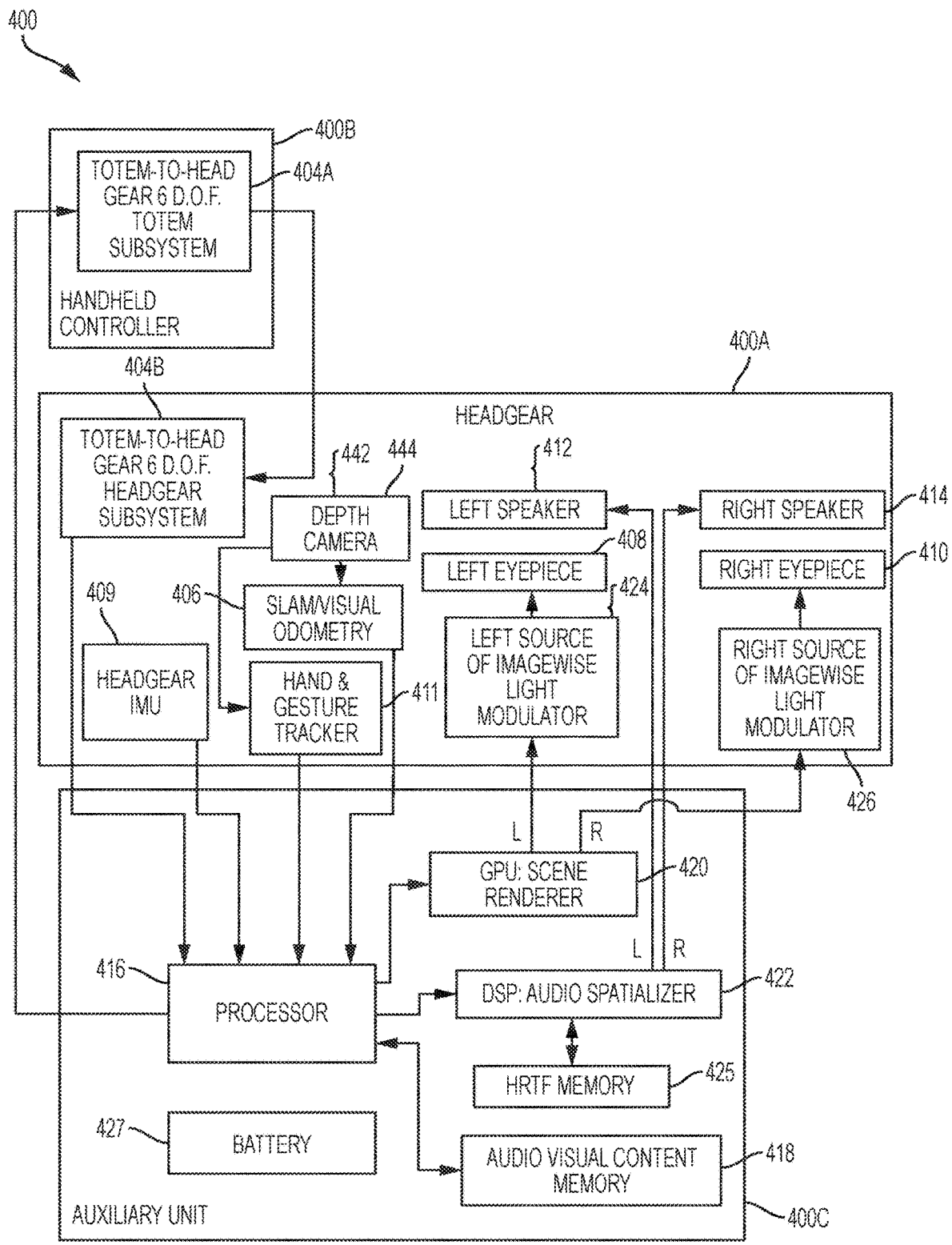
FIG. 4 illustrates an example functional block diagram for an example wearable system, according to some embodiments.

FIG. 4 shows an example functional block diagram that may correspond to an example wearable system 400, such as may include example wearable head device 100, handheld controller 200, and auxiliary unit 300 described above. In some examples, the wearable system 400 could be used for virtual reality, augmented reality, or mixed reality applications. As shown in FIG. 4, wearable system 400 can include example handheld controller 400B, referred to here as a "totem" (and which may correspond to handheld controller 200 described above); the handheld controller 400B can include a totem-to-headgear six degree of freedom (6DOF) totem subsystem 404A. Wearable system 400 can also include example wearable head device 400A (which may correspond to wearable headgear device 100 described above); the wearable head device 400A includes a totem-to-headgear 6DOF headgear subsystem 404B. In the example, the 6DOF totem subsystem 404A and the 6DOF headgear subsystem 404B cooperate to determine six coordinates (e.g., offsets in three translation directions and rotation along three axes) of the handheld controller 400B relative to the wearable head device 400A. The six degrees of freedom may be expressed relative to a coordinate system of the wearable head device 400A. The three translation offsets may be expressed as X, Y, and Z offsets in such a coordinate system, as a translation matrix, or as some other representation. The rotation degrees of freedom may be expressed as sequence of yaw, pitch and roll rotations; as vectors; as a rotation matrix; as a quaternion; or as some other representation. In some examples, one or more depth cameras 444 (and/or one or more non-depth cameras) included in the wearable head device 400A; and/or one or more optical targets (e.g., buttons 240 of handheld controller 200 as described above, or dedicated optical targets included in the handheld controller) can be used for 6DOF tracking. In some examples, the handheld controller 400B can include a camera, as described above; and the headgear 400A can include an optical target for optical tracking in conjunction with the camera. In some examples, the wearable head device 400A and the handheld controller 400B each include a set of three orthogonally oriented solenoids which are used to wirelessly send and receive three distinguishable signals. By measuring the relative magnitude of the three distinguishable signals received in each of the coils used for receiving, the 6DOF of the handheld controller 400B relative to the wearable head device 400A may be determined. In some examples, 6DOF totem subsystem 404A can include an Inertial Measurement Unit (IMU) that is useful to provide improved accuracy and/or more timely information on rapid movements of the handheld controller 400B.

In some examples involving augmented reality or mixed reality applications, it may be desirable to transform coordinates from a local coordinate space (e.g., a coordinate space fixed relative to wearable head device 400A) to an inertial coordinate space, or to an environmental coordinate space. For instance, such transformations may be necessary for a display of wearable head device 400A to present a virtual object at an expected position and orientation relative to the real environment (e.g., a virtual person sitting in a real chair, facing forward, regardless of the position and orientation of wearable head device 400A), rather than at a fixed position and orientation on the display (e.g., at the same position in the display of wearable head device 400A). This can maintain an illusion that the virtual object exists in the real environment (and does not, for example, appear positioned unnaturally in the real environment as the wearable head device 400A shifts and rotates). In some examples, a compensatory transformation between coordinate spaces can be determined by processing imagery from the depth cameras 444 (e.g., using a Simultaneous Localization and Mapping (SLAM) and/or visual odometry procedure) in order to determine the transformation of the wearable head device 400A relative to an inertial or environmental coordinate system. In the example shown in FIG. 4, the depth cameras 444 can be coupled to a SLAM/visual odometry block 406 and can provide imagery to block 406. The SLAM/visual odometry block 406 implementation can include a processor configured to process this imagery and determine a position and orientation of the user's head, which can then be used to identify a transformation between a head coordinate space and a real coordinate space. Similarly, in some examples, an additional source of information on the user's head pose and location is obtained from an IMU 409 of wearable head device 400A. Information from the IMU 409 can be integrated with information from the SLAM/visual odometry block 406 to provide improved accuracy and/or more timely information on rapid adjustments of the user's head pose and position.

In some examples, the depth cameras 444 can supply 3D imagery to a hand gesture tracker 411, which may be implemented in a processor of wearable head device 400A. The hand gesture tracker 411 can identify a user's hand gestures, for example by matching 3D imagery received from the depth cameras 444 to stored patterns representing hand gestures. Other suitable techniques of identifying a user's hand gestures will be apparent.

In some examples, one or more processors 416 may be configured to receive data from headgear subsystem 404B, the IMU 409, the SLAM/visual odometry block 406, depth cameras 444, a microphone 450; and/or the hand gesture tracker 411. The processor 416 can also send and receive control signals from the 6DOF totem system 404A. The processor 416 may be coupled to the 6DOF totem system 404A wirelessly, such as in examples where the handheld controller 400B is untethered. Processor 416 may further communicate with additional components, such as an audio-visual content memory 418, a Graphical Processing Unit (GPU) 420, and/or a Digital Signal Processor (DSP) audio spatializer 422. The DSP audio spatializer 422 may be coupled to a Head Related Transfer Function (HRTF) memory 425. The GPU 420 can include a left channel output coupled to the left source of imagewise modulated light 424 and a right channel output coupled to the right source of imagewise modulated light 426. GPU 420 can output stereoscopic image data to the sources of imagewise modulated light 424, 426. The DSP audio spatializer 422 can output audio to a left speaker 412 and/or a right speaker 414. The DSP audio spatializer 422 can receive input from processor 419 indicating a direction vector from a user to a virtual sound source (which may be moved by the user, e.g., via the handheld controller 400B). Based on the direction vector, the DSP audio spatializer 422 can determine a corresponding HRTF (e.g., by accessing a HRTF, or by interpolating multiple HRTFs). The DSP audio spatializer 422 can then apply the determined HRTF to an audio signal, such as an audio signal corresponding to a virtual sound generated by a virtual object. This can enhance the believability and realism of the virtual sound, by incorporating the relative position and orientation of the user relative to the virtual sound in the mixed reality environment that is, by presenting a virtual sound that matches a user's expectations of what that virtual sound would sound like if it were a real sound in a real environment.

In some examples, such as shown in FIG. 4, one or more of processor 416, GPU 420, DSP audio spatializer 422, HRTF memory 425, and audio/visual content memory 418 may be included in an auxiliary unit 400C (which may correspond to auxiliary unit 300 described above). The auxiliary unit 400C may include a battery 427 to power its components and/or to supply power to wearable head device 400A and/or handheld controller 400B. Including such components in an auxiliary unit, which can be mounted to a user's waist, can limit the size and weight of wearable head device 400A, which can in turn reduce fatigue of a user's head and neck.

While FIG. 4 presents elements corresponding to various components of an example wearable system 400, various other suitable arrangements of these components will become apparent to those skilled in the art. For example, elements presented in FIG. 4 as being associated with auxiliary unit 400C could instead be associated with wearable head device 400A or handheld controller 400B. Furthermore, some wearable systems may forgo entirely a handheld controller 400B or auxiliary unit 400C. Such changes and modifications are to be understood as being included within the scope of the disclosed examples.

Speech Processing Engines

Speech processing systems in general include systems that accept an input audio signal corresponding to human speech (a source signal); process and analyze the input audio signal; and produce, as a result of the analysis, an output corresponding to the human speech. A process or module for performing these tasks may be considered a speech processing engine. In the case of automatic speech recognition systems, the output of a speech processing engine may be a text transcription of the human speech. In the case of natural language processing systems, the output may be one or more commands or instructions indicated by the human speech; or some representation (e.g., a logical expression or a data structure) of the semantic meaning of the human speech. Other types of speech processing systems (e.g., automatic translation systems) are contemplated and are within the scope of the disclosure.

Speech processing systems are found in a diverse array of products and applications: conventional telephone systems; automated voice messaging systems; voice assistants (including standalone and smartphone-based voice assistants); vehicles and aircraft; desktop and document processing software; data entry; home appliances; medical devices; language translation software; closed captioning systems; and others. An advantage of speech processing systems is that they may allow users to provide input to a computer system using natural spoken language, such as presented to a microphone, instead of conventional computer input devices such as keyboards or touch panels; accordingly, speech processing systems may be particularly useful in environments where conventional input devices (e.g., keyboards) may be unavailable or impractical. Further, by permitting users to provide intuitive voice-based input, speech recognition systems can heighten feelings of immersion. As such, speech recognition can be a natural fit for wearable systems, and in particular, for virtual reality, augmented reality, and/or mixed reality applications of wearable systems, in which user immersion is a primary goal, and in which it may be desirable to limit the use of conventional computer input devices, whose presence may detract from feelings of immersion.

Figure 5:
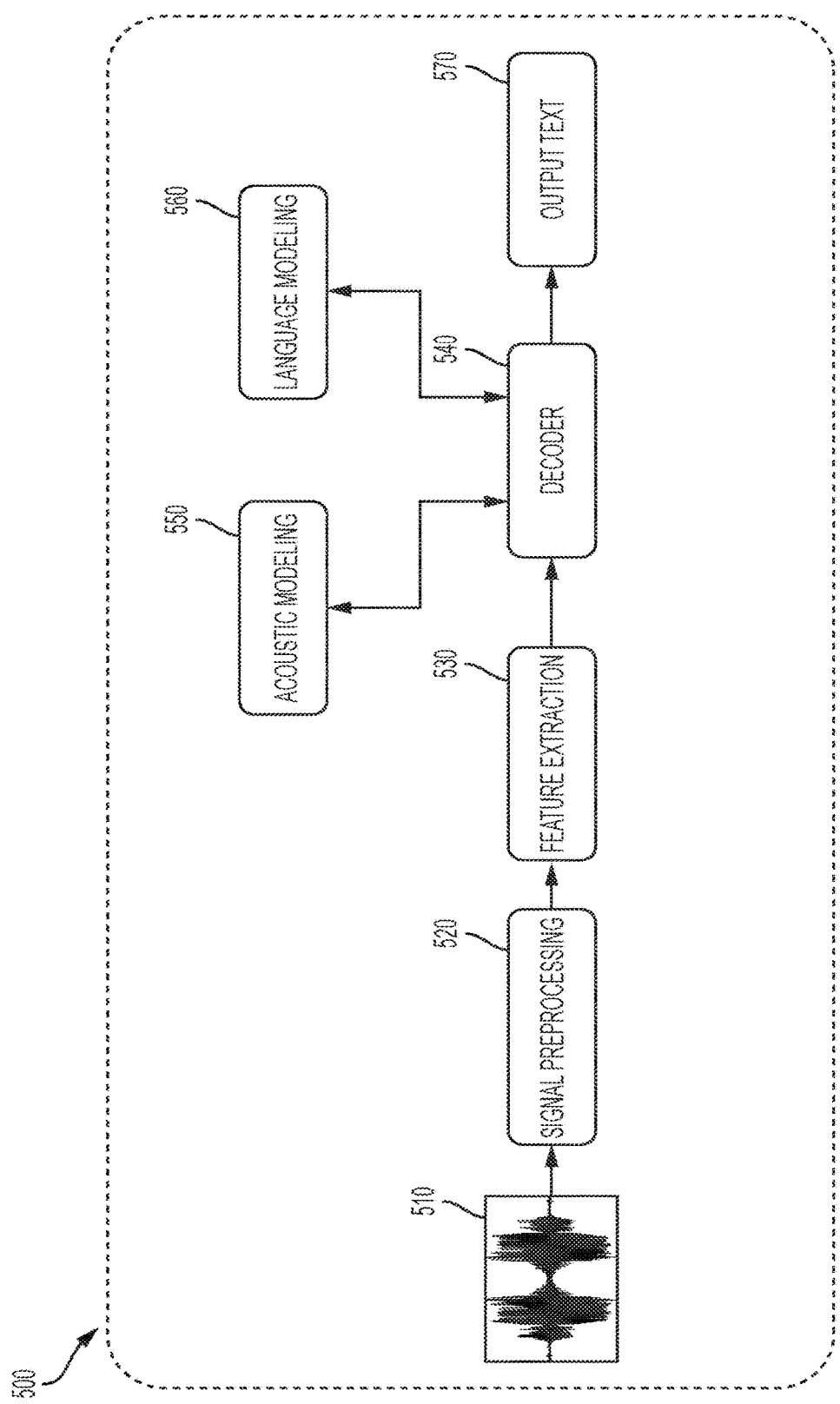
FIG. 5 illustrates a flow chart of an example speech processing system, according to some embodiments.

FIG. 5 shows an automatic speech recognition engine 500, according to some embodiments. Engine 500 is intended to be illustrative of automatic speech recognition systems in general; other specific systems are possible and within the scope of the disclosure. Engine 500 may be implemented using one or more processors (e.g., CPUs, GPUs, and/or DSPs), a memory, an input device (e.g., a microphone), an output device (e.g., a display, a speaker), a network, a database, and/or other suitable components. In engine 500, an audio signal 510, corresponding to a source human speech signal, is presented to a signal preprocessing stage 520. In some examples, signal preprocessing stage 520 can apply one or more signal processing functions to audio signal 510. For example, preprocessing functions can include audio processing functions, such as peak compression; noise reduction; bandlimiting; equalization; signal attenuation; or other suitable functions. These preprocessing functions can simplify the task of later processing and analyzing audio signal 510. For instance, feature extraction algorithms can be calibrated to perform best on input signals having certain audio characteristics, such as gain and frequency characteristics, and where a signal/noise ratio of the input signal is maximized. In some examples, preprocessing audio signal 510 can condition the signal such that the signal can be more reliably analyzed elsewhere in engine 500. For instance, signal preprocessing stage 520 can re-encode audio signal 510 (e.g., re-encoding at a specific bitrate); or convert audio signal 510 from a first form (e.g., a time-domain signal) into a second form (e.g., a frequency-domain signal; or a parametric representation) that may simplify the later processing of audio signal 510. In some examples, one or more functions of preprocessing stage 520 may be performed by a DSP.

At stage 530, a feature extraction process can be applied to audio signal 510 (as preprocessed at stage 520). A goal of feature extraction is to identify individual speech features of audio signal 510, and reduce or eliminate variations in these features so that the features can be effectively and consistently processed (e.g., compared against stored patterns in a database). For example, feature extraction can reduce, eliminate, or control variations in the speaker's pitch, gender, accent, pronunciation, and pacing. Feature extraction can also reduce, eliminate, or control variations in recording equipment (e.g., microphone type), signal transmission (e.g., via land-based telephone lines or cellular telephone networks), or recording environment (e.g., room acoustics; background noise levels; speaker's distance from microphone; speaker's angle to microphone). Various suitable techniques for feature extraction are known in the art.

Speech features extracted from audio signal 510 at stage 530 can be presented to a decoder stage 540. The goal of decoder stage 540 is to determine a text output 570 that corresponds to the source human speech from which audio signal 510 was generated. In some examples, text output 570 need not be text, but can be another data representation of the source speech. Various techniques exist for decoding speech features into text; for example, hidden Markov models; Viterbi decoding; beam search; dynamic search; multipass search; weighted finite state transducers (WFST); or any suitable combination of the above. Other suitable techniques will be familiar to those skilled in the art.

In some examples, decoder 540 can make use of an acoustic modeling stage 550 to facilitate generating text output 570. Acoustic modeling stage 550 can use a model of the relationships between speech signals and linguistic units (e.g., phonemes) to identify one or more linguistic units from an audio signal 510 (including one or more features extracted at stage 530). Various suitable acoustic modeling techniques that can be applied at acoustic modeling stage 550 will be familiar to those skilled in the art.

In some examples, decoder 540 can make use of a language modeling stage 560 to facilitate generating text output 570. Linguistic modeling stage 560 can use a model of a language's grammar, vocabulary, and other characteristics to determine linguistic units (e.g., phonemes) that most probably correspond to features of audio signal 510. For example, a linguistic model applied by stage 560 could conclude that a particular extracted feature is more likely to correspond to a word that appears with a high frequency in the speaker's language than to a word that appears with a low frequency in that language. Various suitable linguistic modeling techniques that can be applied at linguistic modeling stage 560 will be familiar to those skilled in the art. In addition, decoder 540 may make use of other suitable techniques or models to facilitate the generation of text output 570; the disclosure is not limited to any particular technique or group of techniques.

Typically, text output 570 does not correspond to the source human speech with perfect certainty; instead, the likelihood that text output 570 correctly corresponds to the source human speech can be expressed as some probability or confidence interval. Because of the many variables that can affect audio signal 510, even sophisticated speech recognition systems do not consistently produce perfect text output for all speakers. For example, the reliability of speech recognition systems such as engine 500 may be highly dependent on the quality of the input audio signal 510.

Where audio signal 510 is recorded in ideal conditions for example, in acoustically controlled environments, with the human speaker enunciating clearly and directly into a microphone from a close distance the source speech can be more readily determined from the audio signal. For example, features can be more reliably extracted from audio signal 510 at stage 530; and decoder 540 can more effectively determine which text output 570 corresponds to those features (e.g., acoustic modeling can be more reliably applied to the features at stage 550, and/or linguistic modeling can be more reliably applied to the features at stage 560).

In real-world applications, however, audio signal 510 may deviate from ideal conditions, such that determining the source human speech becomes more difficult. For example, audio signal 510 may incorporate environmental noise, such as may be introduced by outdoor environments, or by substantial distances between a human speaker and a microphone; electrical noise, such as from electrical interference (e.g., battery chargers for a smartphone); natural reverberations, such as from nearby surfaces (e.g., concrete, bathroom tile) or acoustic spaces (e.g., caverns, cathedrals); or other unwanted effects. In addition, audio signal 510 may suffer from attenuation of certain frequencies, such as may result when a human speaker faces away from a microphone; this is particularly problematic when the frequencies attenuated are those that carry significant speech-related information (e.g., formant frequencies that can be used to distinguish between vowel sounds). Similarly, audio signal 510 may suffer from overall low amplitude, or low signal/noise ratio, which may be caused when a large distance sits between a human speaker and a microphone. In addition, if the human speaker moves and reorients himself or herself while speaking, the audio signal 510 may change characteristics over the course of the signal, further complicating efforts to determine the underlying speech.

Although example system 500 illustrates an example speech recognition engine, other types of speech processing engines may follow an analogous structure: for example, a natural language processing engine, upon accepting an input audio signal corresponding to human speech, may perform a signal preprocessing stage; extract components from the signal (e.g., via segmentation and/or tokenization stages); and perform detection/analysis of the components, in some cases with the assistance of one or more linguistic modeling subsystems. Moreover, in some examples, the output of an automatic speech recognition engine, such as shown in example system 500, may be used as input to a further language processing engine; for instance, a natural language processing engine could accept as input the text output 570 of example system 500. Such systems may experience challenges analogous to those faced by example system 500. For example, variations in an input audio signal that make it more difficult to recover a source speech signal underlying the audio signal, such as described above, may also make it more difficult to provide other forms of output (e.g., logical expressions or data structures in the case of natural language processing engines). Accordingly, such systems also stand to benefit from the present invention, such as described below.

Improving Speech Processing Using Wearable Systems

The present disclosure is directed to systems and methods for improving the accuracy of speech processing systems by using input from sensors, for example those associated with wearable devices (e.g., head-mounted devices such as described above with respect to FIG. 1) to reduce, eliminate, or control variations in input audio signals, such as those described above with respect to audio signal 510. Such variations may be especially pronounced in mobile applications of speech processing, or in applications of speech processing in uncontrolled environments, such as outdoor environments. Wearable systems are frequently intended for use in such applications, and may experience such variations. The wearable system may generally refer to any combination of a head device (e.g., wearable head device 100), a handheld controller (e.g., handheld controller 200), an auxiliary unit (e.g., auxiliary unit 300), and/or an environment of the head device. In some embodiments, the sensors of the wearable system may be on the head device, the handheld controller, the auxiliary unit, and/or in the environment of the head device. For example, because wearable systems may be designed to be mobile, audio signals recorded at a single stationary microphone (e.g., at a standalone voice assistant device) from a user of a wearable system may suffer from a low signal/noise ratio if the user is far from the single stationary microphone, or from "acoustic shadows" or unwanted frequency response if the user faces away from the microphone. Moreover, the audio signal may change characteristics over time as the user moves and turns with respect to the single stationary microphone, as may be expected by a mobile user of a wearable system. In addition, because some wearable systems are intended for use in uncontrolled environments, a high potential exists for environmental noise (or speech of other humans) to be recorded along with the target human speech. Similarly, such uncontrolled environments can introduce unwanted echoes and reverberations into audio signal 510 that can obscure the underlying speech.

As described above with respect to example wearable head device 100 in FIG. 1, a wearable system can include one or more sensors that can provide input about the user and/or the environment of the wearable system. For instance, wearable head device 100 can include a camera (e.g., camera 444 described in FIG. 4) to output visual signals corresponding to the environment; in some examples, the camera can be a forward-facing camera on a head-mounted unit that shows what is currently in front of the user of the wearable system. In some examples, wearable head device 100 can include a LIDAR unit, a radar unit, and/or acoustic sensors, which can output signals corresponding to the physical geometry (e.g., walls, physical objects) of the user's environment. In some examples, wearable head device 100 can include a GPS unit, which can indicate geographic coordinates corresponding to the wearable system's current location. In some examples, wearable head device 100 can include an accelerometer, a gyroscope; and/or an inertial measurement unit (IMU) to indicate an orientation of the wearable head device 100. In some examples, wearable head device 100 can include environmental sensors, such as temperature or pressure sensors. In some examples, wearable head device 100 can include biometric sensors, such as iris cameras; fingerprint sensors; eye tracking sensors; or sensors to measure a user's vital signs. In examples where wearable head device 100 includes a head-mounted unit, such orientation can correspond to an orientation of the user's head (and, by extension, the user's mouth and a direction of the user's speech). Other suitable sensors can be included. In some embodiments, the handheld controller 200, the auxiliary unit 300, and/or the environment of the wearable head device 100 can include any suitable one or more of the sensors mentioned above with respect to the wearable head device 100. In addition, in some cases, one or more sensors may be placed in an environment with which the wearable system interacts. For instance, a wearable system may be designed to be worn by a driver of an automobile, and appropriate sensors (e.g., depth cameras, accelerometers, etc.) may be placed in the interior of the automobile. One advantage of this approach is that the sensors can occupy a known location within the environment; compared to sensors that can be attached to a wearable device that moves within the environment, this configuration can simplify the interpretation of data provided by those sensors.

The signals provided by such sensors of the wearable system (e.g., the wearable head device 100, the handheld controller 200, the auxiliary unit 300, and/or the environment of the wearable head device 100) can be used to provide information about the characteristics of an audio signal recorded by the wearable system, and/or information about the relationship between the audio signal and an underlying source speech signal. This information can in turn be used to more effectively determine source speech underlying that audio signal.

Figure 6:
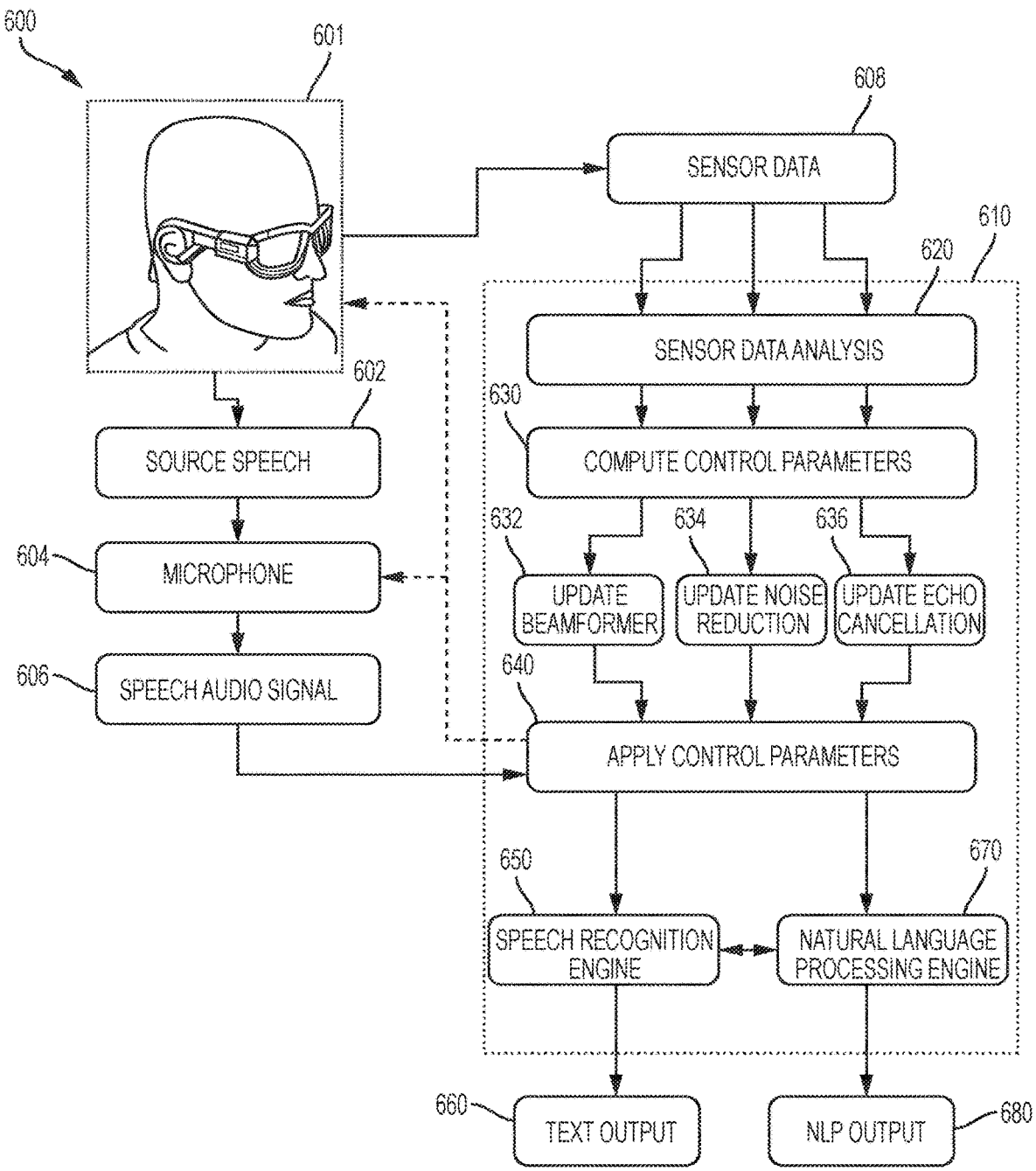
FIG. 6 illustrates a flow chart of an example system for processing acoustic speech signals, according to some embodiments.

To illustrate, FIG. 6 shows an example speech recognition system 600 that incorporates a wearable system to improve speech recognition of an audio signal recorded by one or more microphones. FIG. 6 shows a user of a wearable system 601, which may correspond to wearable system 400 described above, and which may include one or more of example wearable head device 100; handheld controller 200; and auxiliary unit 300. The user of wearable system 601 provides a verbal utterance 602 (the "source speech") which is detected at one or more microphones 604, which output corresponding audio signal 606. Wearable system 601 can include one or more sensors described above, including one or more of a camera; a LIDAR unit, a radar unit; an acoustic sensor; a GPS unit; an accelerometer; a gyroscope; an IMU; a microphone (which may be one of microphones 604); a temperature sensor; biometric sensors; or any other suitable sensor or combination of sensors. Wearable system 601 can also include one or more processors (e.g., CPUs, GPUs, and/or DSPs), a memory, an input device (e.g., a microphone), an output device (e.g., a display, a speaker), a network, and/or a database. These components may be implemented using a combination of a wearable head device 100, a handheld controller 200, and an auxiliary unit 300. In some examples, sensors of wearable system 601 provide sensor data 608 (which may be multichannel sensor data such as in examples where one or more sensors, including sensors from two or more sensor types, are presented in parallel). Sensor data 608 may be provided concurrently with microphones 604 detecting the source speech; that is, the sensors of wearable system 601 can provide sensor data 608 corresponding to conditions at the time the source speech is provided. In some examples, one or more of microphones 604 can be included in a wearable head device, a handheld controller, and/or an auxiliary unit of wearable system 601 and/or in an environment thereof.

In example system 600, subsystem 610 can accept as input sensor data 608 and audio signal 606; determine control parameters to apply to process audio signal 606; and provide the processed audio signal as input to a signal processing engine (e.g., speech recognition engine 650 and/or natural language processing (NLP) engine 670), which may generate an output (e.g., text output 660 and/or natural language processing output 680, respectively). Subsystem 610 includes one or more processes, stages, and/or modules described below and shown in FIG. 6. Subsystem 610 can be implemented using one or more processors (e.g., CPUs, GPUs, and/or DSPs), a memory, a network, a database, and/or any combination of other suitable components. In some examples, some or all of subsystem 610 can be implemented on wearable system 601: for example, on one or more of a head device (e.g., wearable head device 100); a handheld controller (e.g., handheld controller 200); and/or an auxiliary unit (e.g., auxiliary unit 300). In some examples, some or all of subsystem 610 can be implemented on a device containing microphone 604 (e.g., a smartphone, or a standalone voice assistant device). In some examples, some or all of subsystem 610 can be implemented on a cloud server or another network-enabled computing device. For instance, a local device could perform latency-sensitive functions of subsystem 610, such as those related to processing audio signals and/or sensor data; while a cloud server or other network-enabled device could perform functions of subsystem 610 that require large computational or memory resources (e.g., training or applying a complex artificial neural network), and transmit the output to the local device. Other implementations of subsystem 610 will be apparent to those skilled in the art and are within the scope of the disclosure.

In example system 600, subsystem 610 includes a sensor data analysis stage 620. Sensor data analysis stage 620 can process and analyze sensor data 608, for example in order to determine information about the environment of wearable system 601. In examples where sensor data 608 includes sensor data from disparate sources (e.g., camera data and GPS data), sensor data analysis stage 620 can combine the sensor data ("sensor fusion") according to techniques known to those in the art (e.g., Kalman filters). In some examples, sensor data analysis stage 620 can incorporate data from other sources in addition to sensor data 608. For instance, sensor data analysis stage 620 can combine sensor data 608 from a GPS unit with map data and/or satellite data (e.g., from a memory or database storing such data) in order to determine location information based on the output of the GPS unit. As an example, the GPS unit could output, as part of sensor data 608, GPS coordinates corresponding to the latitude and longitude of wearable system 601. Sensor data analysis stage 620 could use the latitude and longitude with map data to identify in what country, town, street, unit (e.g., commercial unit or residential unit), or room the wearable system 601 is located; or to identify nearby businesses or points of interest. Similarly, architectural data (e.g., from public structural records) can be combined with the sensor data 608 to identify a building in which wearable system 601 is located; or weather data (e.g., from a real-time feed of satellite data) can be combined with the sensor data 608 to identify current weather conditions at that location. Other example applications will be apparent and are within the scope of the disclosure.

On a smaller scale, sensor data analysis stage 620 can analyze sensor data 608 to generate information relating to objects and geometry in the immediate vicinity of wearable system 601, or relating to a user of wearable system 601. For example, using techniques known in the art, data from a LIDAR sensor or radar unit of wearable system 601 can indicate that wearable system 601 is facing a wall located eight feet away, at an angle θ to a normal of that wall; and image data from a camera of wearable system 601 can identify that wall as likely being made of ceramic tile (an acoustically reflective material). In some examples, an acoustic sensor of wearable system 601 can be used to measure acoustic effects that a surface may have on an acoustic signal (e.g., by comparing a reflected signal from the surface to a source signal transmitted to the surface). In some examples, sensor data analysis stage 620 can use sensor data 608 to determine a position and/or orientation of the user of wearable system 601, for example using an accelerometer, gyroscope, or IMU associated with wearable system 601. In some examples, such as in augmented reality or mixed reality applications, stage 620 can incorporate a map or other representation of the user's current environment; for example, in cases where sensors of wearable system 601 have been used to construct a 3D representation of the geometry of a room, that 3D representation data can be used in conjunction with sensor data 608. Similarly, stage 620 can incorporate information such as the materials of nearby surfaces, and acoustic properties of those surfaces; information relating to other users in the environment (e.g., their locations and orientations, and/or the acoustic characteristics of their voices); and/or information about the user of wearable system 601 (e.g., the user's age group, gender, native language, and/or vocal characteristics).

In some examples, sensor data analysis stage 620 can analyze sensor data 608 to generate information relating to microphones 604. For example, sensor data 608 may provide a position and/or orientation of one or more microphones 604, such as the position and/or orientation relative to wearable system 601. In examples where wearable system 601 includes one or more microphones 604, the position and orientation of one or more microphones 604 may be directly linked to the position and orientation of the wearable system 601. In some examples, wearable system 601 can include one or more additional microphones that are not one or more microphones 604; such additional one or more microphones can be used to provide a baseline audio signal, for example corresponding to a user's speech as detected from a known position and orientation, and from a short distance. For example, the additional one or more microphones may be in known positions with known orientations in an environment of the user. The amplitude, phase, and frequency characteristics of this baseline audio signal can be compared to audio signal 606 to identify a relationship between the source speech 602 and audio signal 606. For example, if a first audio signal detected at a first time has an amplitude one-half that of the baseline audio signal, and a second audio signal detected at a second time has an amplitude one-fourth that of the baseline audio signal, it may be inferred that the user has moved away from microphone 604 during the interval between the first time and the second time. This can be extended to any suitable number of microphones (e.g., an initial microphone, and two or more additional microphones).

Information output by sensor data analysis stage 620, based on sensor data 608 and/or other data as described above, can identify a relationship between source speech 602 and corresponding audio signal 606. Information describing this relationship can be used at stage 630 to compute one or more control parameters that can be applied to audio signal 606, to one or more microphones 604, and/or to wearable system 601. Application of these control parameters can improve the accuracy with which system 600 can recover the underlying source speech 602 from audio signal 606. In some examples, control parameters computed at stage 630 can include digital signal processing (DSP) parameters for that can be applied to process audio signal 606. For instance, such control parameters can include parameters for a digital signal processing (DSP) noise reduction process (e.g., a signal threshold below which gated noise reduction will be applied to audio signal 606, or a noisy frequency of audio signal 606 to be attenuated); parameters for a DSP echo cancellation or dereverberation process (e.g., a time value corresponding to a delay between audio signal 606 and an echo of that signal); or parameters for other audio DSP processes (e.g., phase correction, limiting, pitch correction).

In some examples, control parameters can define a DSP filter to be applied to audio signal 606. For instance, sensor data 608 (e.g., from a microphone of a head-mounted unit of wearable system 601) can indicate a characteristic frequency curve corresponding to the voice of the user of the wearable system 601 (i.e., the user generating source speech 602). This frequency curve can be used to determine control parameters defining a digital bandpass filter to apply to audio signal 606; this bandpass filter can isolate frequencies corresponding closely to source speech 602, in order to make source speech 602 more prominent in audio signal 606. In some examples, sensor data 608 (e.g., from a microphone of a head-mounted unit of wearable system 601) can indicate a characteristic frequency curve corresponding to the voice of a different user (other than the user of the wearable system 601) in the vicinity of the wearable system 601. This frequency curve can be used to determine control parameters defining a digital notch filter to apply to audio signal 606; this notch filter can remove unwanted voices from audio signal 606, in order to render source speech 602 more prominent in audio signal 606. Similarly, sensor data 608 (e.g., a camera of wearable system 601) can identify specific other individuals in the vicinity, and their positions relative to the wearable system 601; this information can determine a level of the notch filter (e.g., the closer an individual is, the louder his or her voice is likely to be in audio signal 606, and the greater a level attenuation that may need to be applied). As another example, the presence of certain surfaces and/or materials in the vicinity of a user may affect the frequency characteristics of that user's voice as detected by microphone 604; for instance, if the user is standing in the corner of a room, certain low frequencies of the user's voice may be accentuated in audio signal 606; this information can be used to generate parameters (e.g., a cutoff frequency) of a high-pass filter to be applied to audio signal 606. These control parameters can be applied to audio signal 606 at stage 640; or as part of speech recognition engine 650 and/or natural language processing engine 670 (e.g., at a stage corresponding to signal preprocessing stage 520 or feature extraction stage 530 described above).

In some examples, control parameters computed at stage 630 can be used to configure microphone 604. For example, such control parameters can include hardware configuration parameters, such as gain levels for a hardware amplifier coupled to microphone 604; beamforming parameters to adjust a directionality of microphone 604 (e.g., a vector at which microphone 602 should be directed); parameters to determine which of a plurality of microphones 604 should be enabled or disabled; or parameters to control where a microphone 604 should be positioned or oriented (e.g., in examples where microphone 604 is attached to a mobile platform). In some examples, microphone 604 may be a component of a smartphone, or another mobile device; and the control parameters computed at stage 630 can be used to control the mobile device (e.g., to enable various components of the mobile device, or to configure or operate software on the mobile device).

In some examples, control parameters computed at stage 630 can be used to control wearable system 601 itself. For example, such control parameters could include parameters for presenting a message to a user of wearable system 601, such as via displays 110A/110B or speakers 120A/120B (e.g., an audio or video message that the user should move away from a nearby wall in order to improve speech recognition accuracy); or parameters to enable, disable, or reconfigure one or more sensors of wearable system 601 (e.g., to reorient a servo-mounted camera in order to obtain more useful camera data). In examples where the wearable system 601 includes microphones 604, control parameters can be sent to wearable system 601 in order to control microphones 604 such as described above.

In some examples, control parameters computed at stage 630 can be used to affect a decoding process (e.g., decoding process 540 described above) of a speech processing system (e.g., speech recognition engine 650 and/or natural language processing engine). For example, sensor data 608 may indicate characteristics of a user's environment, behaviors, or mental state that may affect the user's use of language. For instance, sensor data 608 (e.g., from a camera and/or a GPS unit) may indicate that the user is attending a football game; because the user's speech (i.e., source speech 602) may be much more likely than usual to include football-related words (e.g., "coach," "quarterback," "touchdown") while the user is attending a football game, a control parameter of a speech processing system (e.g., language modeling stage 560) can be temporarily set to reflect a higher probability that an audio signal corresponds to a football-related word.

In some examples, such as shown in FIG. 6, individual update modules 632, 634, and 636 can determine control parameters computed at stage 630, or can apply the control parameters computed at stage 630, and/or sensor data 608, to audio signal 606; microphone 604; wearable system 601; or to any hardware or software subsystem of the above. For example, a beamformer update module 632 can determine, based on sensor data 608 or one or more control parameters computed at stage 630, how a beamforming module (e.g., a beamforming module of microphone 604) can be updated to improve the recognition or natural language processing of audio signal 606. In some examples, beamforming update module 632 can control the directivity of a sensor array (e.g., an array of microphones 604) in order to maximize a signal/noise ratio of a signal detected by the sensor array. For instance, the beamforming update module 632 can adjust the directivity of microphones 604 such that source speech 602 is detected with a minimum of noise and distortion; for example, in a room with multiple voices, software of an adaptive beamforming module can direct microphones 604 to maximize the signal power corresponding to a voice of interest (e.g., the voice corresponding to source speech 602). For instance, sensors of wearable system 601 can output data indicating that wearable system 601 is located a certain distance from microphones 604, from which a time-of-flight value of the source speech 602 to microphones 604 can be determined. This time-of-flight value can be used to calibrate the beamforming, using techniques familiar to those skilled in the art, in order to maximize the ability of speech recognition engine 650 to identify source speech 602 from audio signal 606.

In some examples, a noise reduction update module 634 can determine, based on sensor data 608 or one or more control parameters computed at stage 630, how a noise reduction process can be updated to improve the recognition or natural language processing of audio signal 606. In some examples, noise reduction update module 634 can control parameters of a noise reduction process applied to audio signal 606 in order to maximize a signal/noise ratio of audio signal 606; this in turn can facilitate automatic speech recognition performed by speech recognition engine 650. For instance, noise reduction update module 634 can selectively apply signal attenuation to frequencies of audio signal 606 on which noise is likely to be present, while boosting (or declining to attenuate) frequencies of audio signal 606 which carry information of the source speech 602. Sensors of wearable system 601 can provide data to help noise reduction update module 634 identify which frequencies of audio signal 606 are likely to correspond to noise, and which frequencies are likely to carry information about the source speech 602. For instance, sensors of wearable system 601 (e.g., GPS, LIDAR, etc.) may identify that wearable system 601 is located on an airplane. An airplane may be associated with background noise having certain characteristic frequencies; for example, airplane engine noise may be concentrated primarily around a known frequency $f_0$. Based on this information from the sensors, noise reduction update module 634 can attenuate frequency $f_0$ of audio signal 606. Similarly, sensors of wearable system 601 (e.g., a microphone mounted to wearable system 601) can identify a frequency signature corresponding to the voice of a user of wearable system 601; noise reduction update module 634 can apply a bandpass filter to a frequency range corresponding to that frequency signature, or can ensure that noise reduction is not applied to that frequency range.

In some examples, an echo cancellation (or dereverberation) update module 636 can determine, based on sensor data 608 or one or more control parameters computed at stage 630, how an echo cancellation unit can be updated to improve the recognition or natural language processing of audio signal 606. In some examples, echo cancellation update module 636 can control parameters of a echo cancellation unit applied to audio signal 606 in order to maximize the ability of a speech recognition engine 650 to determine source speech 602 from audio signal 606. For instance, echo cancellation update module 636 can instruct an echo cancellation unit to detect and correct for (e.g., via a comb filter) echoes in audio signal 606 that follow the source speech by 100 milliseconds. Because such echoes can interfere with the ability of speech processing systems (e.g., speech recognition engine 650, natural language processing engine 670) to determine source speech (e.g., by affecting the ability to extract features, such as described above with respect to FIG. 5 at stage 530, from audio signal 606), removing these echoes can result in higher accuracy of speech recognition, natural language processing, and other speech processing tasks. In some examples, sensors of wearable system 601 can provide sensor data 608 that can be used to determine control parameters for echo cancellation. For example, such sensors (e.g., camera, LIDAR, radar, acoustic sensors) can determine that a user of wearable system 601 is located ten feet from a surface, and faces that surface at an angle $\theta_1$ to a normal of that surface, and further that microphone 604 is located twenty feet from that surface, and faces the surface at an angle $\theta_2$. It can be computed from this sensor data that the surface is likely to produce an echo that reaches microphone 604 at a certain time after the source signal 602 (i.e., the time-of-flight from the user to the surface plus the time-of-flight from the surface to microphone 604). Similarly, it can be determined from the sensor data that the surface corresponds to a bathroom tile surface, or another surface with known acoustic reflective properties; and those reflective properties can be used to compute control parameters of a dereverberation unit that will attenuate the resultant acoustic reflections in audio signal 606.

Similarly, in some examples, signal conditioning can be applied to speech audio signal 606 to account for equalization applied to the speech audio signal 606 by an acoustic environment. For instance, a room can increase or attenuate certain frequencies of speech audio signal 606, for example by virtue of the room's geometry (e.g., dimensions, cubic volume), materials (e.g., concrete, bathroom tile), or other characteristics that can affect the signal as it is detected by a microphone (e.g., microphone 604) in the acoustic environment. These effects can complicate the ability of speech recognition engine 650 to perform consistently across different acoustic environments. Sensors of wearable system 601 can provide sensor data 608 which can be used to counteract such effects. For instance, sensor data 608 can indicate, as described above, a size or shape of a room, or the presence of acoustically significant materials, from which one or more filters can be determined, and applied to the audio signal to counteract room effects. In some examples, sensor data 608 can be provided by sensors (e.g., camera, LIDAR, radar, acoustic sensors) that indicate a cubic volume of a room in which the user is present; an acoustic effect of that room can be modeled as a filter; and an inversion of that filter can be applied to an audio signal to compensate for that acoustic effect.

In some examples, modules 632, 634, or 636, or other suitable elements of example system 600 (e.g., stage 620 or stage 640) can make use of predetermined mappings to determine control parameters based on sensor data 608. In some examples described above, control parameters are computed directly based on sensor data 608. For instance, as described above, an echo cancellation update module 636 can determine control parameters for an echo cancellation unit that can be applied to attenuate echoes present in audio signal 606. As described above, such control parameters can be computed by geometrically determining the distance between wearable system 601 and a microphone 604; computing the time-of-flight that an audio signal traveling at the speed of sound in air would require to travel from the wearable system 601 to the microphone; and setting an echo period of the echo cancellation unit to correspond to that time-of-flight. In some cases, though, the control parameters can be determined by comparing sensor data 608 to a mapping of sensor data to control parameters. Such a mapping could be stored in a database, such as on a cloud server or another networked device. In some examples, one or more elements of example system 601 (e.g., beamformer update module 632, noise reduction update module 634, echo cancellation update module 636, stage 630, stage 640, speech recognition engine 650, and/or natural language processing engine 670) can query a database to retrieve one or more control parameters that correspond to sensor data 608. This process can occur instead of, or in addition to, direct computation of control parameters such as described above. In such a process, sensor data 608 could be provided to the predetermined mapping; and one or more control parameters that most closely correspond to sensor data 608 in the predetermined mapping can be returned. Using a predetermined mapping of sensor data to parameters can carry several advantages. For instance, performing a lookup from a predetermined mapping can be computationally less expensive than processing sensor data in real-time particularly when the computations may involve complex geometric data, or where sensors of wearable system 601 may suffer from significant latency or bandwidth limitations. Further, predetermined mappings can capture relationships between sensor data and control parameters that may be difficult to compute from sensor data alone (e.g. by mathematical modeling).

In some examples, machine learning techniques can be used to generate or refine mappings of sensor data to control parameters, or to otherwise determine control parameters from sensor data 608. For example, a neural network (or other appropriate machine learning technology) can be trained to identify desired control parameters based on sensor data input, according to techniques familiar to those skilled in the art. Desired control parameters can be identified, and the neural network further refined, through user feedback. For example, users of system 600 can be prompted to rate the quality of speech recognition output (e.g., text output 660) and/or natural language processing output (e.g., natural language processing output 680). Such user ratings can be used to adjust the likelihood that a given set of sensor data will result in a particular set of control parameters. For example, if users report a high rating of text output 660 for a particular set of control parameters and a particular set of sensor data, a mapping of that sensor data to those control parameters can be created (or a link between them strengthened). Conversely, a low rating can cause a mapping of the sensor data to the control parameters to be weakened or deleted.

Similarly, machine learning techniques can be utilized to improve the ability of a speech recognition engine (e.g., 650) to discriminate between speech belonging to a user, and speech belonging to other entities for example, speech emanating from a television or a stereo system. As described above, neural network (or other appropriate machine learning technology) can be trained to perform this discrimination (i.e., determining whether input audio belongs to the user, or to some other source). In some cases, a calibration routine, in which the user provides a set of input audio known to belong to that user, can be used to train the neural network. Other suitable machine learning technologies can be used for the same purpose.

While update modules 632, 634, and 636 are described to comprise a beamforming update module, a noise reduction update module, and an echo cancellation module, respectively, other suitable modules may be included in any combination. For instance, in some examples, an EQ update module can determine how filtering processes (such as described above) can be updated, based on sensor data 608 and/or one or more control parameters computed at stage 630. Moreover, the functions described above with respect to modules 632, 634, and 636 can be performed as part of other elements of example system 600, such as stage 630 and/or stage 640, or speech recognition engine 650 or natural language processing engine 670.

Although the disclosed examples have been fully described with reference to the accompanying drawings, it is to be noted that various changes and modifications will become apparent to those skilled in the art. For example, elements of one or more implementations may be combined, deleted, modified, or supplemented to form further implementations. Such changes and modifications are to be understood as being included within the scope of the disclosed examples as defined by the appended claims.

What is claimed is:

1. A method of processing an acoustic signal, the method comprising:
   receiving, via a microphone, the acoustic signal associated with a user of a wearable device;
   receiving, via one or more sensors, one or more sensor inputs, wherein the one or more sensor inputs indicate a location of the user and a material associated with the location of the user;
   determining, based on the one or more sensor inputs, the location of the user;
   determining, based on the one or more sensor inputs, the material associated with the location;
   determining a cutoff frequency of a filter based on the location of the user and further based on the material associated with the location; and
   applying the filter to the acoustic signal.

2. The method of claim 1, wherein the filter is applied to the acoustic signal to generate a second acoustic signal, and the method further comprises providing the second acoustic signal to a speech recognition engine to generate text output associated with the acoustic signal.

3. The method of claim 1, wherein the filter is applied to the acoustic signal to generate a second acoustic signal, and the method further comprises providing the second acoustic signal to a natural language processing engine to generate natural language data associated with the acoustic signal.

4. The method of claim 1, further comprising:
determining control parameters based on the one or more sensor inputs; and
applying the control parameters to the acoustic signal.

5. The method of claim 4, further comprising:
detecting, based on the one or more sensor inputs, a surface; and
determining an effect of the surface on the acoustic signal, wherein the control parameters cause a reduction of the effect of the surface on the acoustic signal.

6. The method of claim 5, further comprising determining an acoustic property of the surface, wherein the effect of the surface on the acoustic signal is determined based on the acoustic property.

7. The method of claim 4, further comprising:
detecting, based on the one or more sensor inputs, a person different from the user; and
determining an effect of the person on the acoustic signal, wherein the control parameters cause a reduction of the effect of the person on the acoustic signal.

8. The method of claim 4, wherein the control parameters comprise a control parameter for echo cancellation, and said determining the control parameters based on the one or more sensor inputs comprises:
detecting, based on the one or more sensor inputs, a surface; and
determining a time of flight between the surface and the microphone.

9. The method of claim 4, wherein the control parameters comprise a control parameter for beamforming, and said determining the control parameters based on the one or more sensor inputs comprises determining a time of flight between the user and the microphone.

10. The method of claim 4, further comprising determining a three-dimensional representation of an environment of the wearable device; and wherein said determining the control parameters is further based on the three-dimensional representation of the environment of the wearable device.

11. The method of claim 1, further comprising:
determining a quality of the acoustic signal;
in accordance with a determination that the quality of the acoustic signal is below a quality threshold, presenting a message to the user to move from the location to a new location to improve the quality of the acoustic signal.

12. The method of claim 1, wherein the wearable device comprises the one or more sensors.

13. The method of claim 12, wherein:
the one or more sensor inputs comprise an image, and the material associated with the location is determined based on the image.

14. The method of claim 1, wherein the filter comprises a high-pass filter.

15. A system comprising:
a wearable device;
a microphone;
one or more sensors; and
one or more processors configured to perform a method comprising:
receiving, via the microphone, an acoustic signal associated with a user of the wearable device;
receiving, via the one or more sensors, one or more sensor inputs, wherein the one or more sensor inputs indicate a location of the user and a material associated with the location of the user;
determining, based on the one or more sensor inputs, the location of the user;
determining, based on the one or more sensor inputs, the material associated with the location;
determining a cutoff frequency of a filter based on the location of the user and further based on the material associated with the location; and
applying the filter to the acoustic signal.

16. The system of claim 14, wherein the method further comprises:
determining control parameters based on the one or more sensor inputs;
applying the control parameters to the acoustic signal;
detecting, based on the one or more sensor inputs, a surface; and
determining an effect of the surface on the acoustic signal, wherein the control parameters cause a reduction of the effect of the surface on the acoustic signal.

17. The system of claim 15, wherein the filter is applied to the acoustic signal to generate a second acoustic signal, and the method further comprises providing the second acoustic signal to a speech recognition engine to generate text output associated with the acoustic signal.

18. The system of claim 15, wherein the filter is applied to the acoustic signal to generate a second acoustic signal, and the method further comprises providing the second acoustic signal to a natural language processing engine to generate natural language data associated with the acoustic signal.

19. The system of claim 15, wherein the wearable device comprises the one or more sensors.

20. The system of claim 15, wherein the filter comprises a high-pass filter.

21. A non-transitory computer-readable medium storing instructions that, when executed by one or more processors, cause the one or more processors to perform a method comprising:
receiving, via a microphone, an acoustic signal associated with a user of a wearable device;
receiving, via one or more sensors, one or more sensor inputs, wherein the one or more sensor inputs indicate a location of the user and a material associated with the location of the user;
determining, based on the one or more sensor inputs, the location of the user;
determining, based on the one or more sensor inputs, the material associated with the location;
determining a cutoff frequency of a filter based on the location of the user and further based on the material associated with the location; and
applying the filter to the acoustic signal.

* * * * *

UNITED STATES PATENT AND TRADEMARK OFFICE
CERTIFICATE OF CORRECTION

PATENT NO. : 12,347,448 B2
APPLICATION NO. : 18/510376
DATED : July 1, 2025
INVENTOR(S) : Colby Nelson Leider Page 1 of 1

It is certified that error appears in the above-identified patent and that said Letters Patent is hereby corrected as shown below:

In the Claims

At Column 20, Claim number 16, Line number 20: please replace "claim 14" with --claim 15--.

Signed and Sealed this
Second Day of September, 2025

Coke Morgan Stewart
*Acting Director of the United States Patent and Trademark Office*